United States Patent [19]

Kaufman

[11] Patent Number: 5,598,420
[45] Date of Patent: Jan. 28, 1997

[54] APPARATUS AND METHOD FOR GENERATING A POWER SIGNAL FOR A POWER SYSTEM FROM SIGNALS GENENRATED BY A COMMUNICATION DEVICE

[75] Inventor: Barry M. Kaufman, Pine Brook, N.J.

[73] Assignee: ABB Power T&D Company, Inc., Raleigh, N.C.

[21] Appl. No.: 577,063

[22] Filed: Dec. 22, 1995

Related U.S. Application Data

[63] Continuation of Ser. No. 134,291, Oct. 8, 1993, abandoned.

[51] Int. Cl.⁶ ................................................. G06F 11/00
[52] U.S. Cl. ........................ 371/20.1; 375/222; 371/68.2; 379/8
[58] Field of Search ............................ 371/20.1, 5.1, 371/62, 68.2; 375/224, 298, 222; 379/8; 358/406, 504

[56] References Cited

U.S. PATENT DOCUMENTS

| | | | |
|---|---|---|---|
| 4,112,264 | 9/1978 | Abramson et al. | 179/175.35 |
| 4,187,414 | 2/1980 | Fahrenschon et al. | 179/175.35 |
| 4,332,029 | 5/1982 | Campbell et al. | 371/22 |
| 4,422,175 | 12/1983 | Bingham et al. | 375/14 |
| 4,547,633 | 10/1985 | Szechenyi | 371/20.1 |
| 4,633,046 | 12/1986 | Kitayama et al. | 370/32.1 |
| 4,642,807 | 2/1987 | Comroe et al. | 371/20.1 |
| 4,789,948 | 12/1988 | Von der Embse | 371/20.1 |
| 4,856,030 | 8/1989 | Butzer et al. | 375/106 |
| 4,859,951 | 8/1989 | Cole et al. | 324/334 |
| 4,864,573 | 9/1989 | Horsten | 371/5.1 |
| 5,020,077 | 5/1991 | Rhodes | 375/8 |
| 5,025,453 | 6/1991 | Hurinville | 371/20.1 |
| 5,113,389 | 5/1992 | Cox | 370/32.1 |
| 5,138,616 | 8/1992 | Wagner, Jr. et al. | 371/5.1 |
| 5,148,435 | 9/1992 | Ray, Jr. et al. | 371/20.1 |
| 5,163,051 | 11/1992 | Biessman et al. | 371/20.1 |
| 5,187,811 | 2/1993 | Baker et al. | 371/5.1 |
| 5,282,032 | 1/1994 | Baker | 371/5.1 |
| 5,325,397 | 6/1994 | Scholz et al. | 371/5.1 |

OTHER PUBLICATIONS

*Interface Guide* for "R96DP 9600 bps Data Pump Modem", Rockwell International, Academic Press, pp. 8–10, 12–15, 20, 31, 51–53, 57–62 (Apr. 1985).

*Primary Examiner*—Robert W. Beausoliel, Jr.
*Assistant Examiner*—Joseph E. Palys
*Attorney, Agent, or Firm*—Woodcock Washburn Kurtz Mackiewicz & Norris

[57] ABSTRACT

Method and System for providing a gateway between a communications device and data receiving device which corrects a data signal produced by the communications device by reducing the data errors produced by the communications device by replacing the data signal with a guard signal when the error exceeds a bandwidth and by controlling the communications device so that it provides predictable propagation delays by resetting an adaptive component of the communications device to perform a major convergence and by setting the coefficients used by the adaptive component to predetermined initial values.

26 Claims, 4 Drawing Sheets

APPARATUS AND METHOD FOR GENERATING A POWER SIGNAL FOR A POWER SYSTEM FROM SIGNALS GENENRATED BY A COMMUNICATION DEVICE

This is a continuation, of application Ser. No. 08/134,291, filed Oct. 8, 1993, now abandoned.

FIELD OF THE INVENTION

The present invention is embodied in a telecommunications module which serves as a gateway between a communications device, such as a Modulator/Demodulator ("Modem"), and another device, specifically, in a telecommunications module which serves as a gateway between a Quadrature Amplitude Modulation ("QAM") Modem and a power substation.

BACKGROUND OF THE INVENTION

Communications devices which provide a relatively error free and propagation delay predictable interface between a data receiving device and a network such as a central switching office or cellular network are desirable. Most communications devices, however, only provide the capability to detect errors and predict and control propagation delays within certain tolerances and use adaptive components to reduce the level of errors in data received from a network and to make the propagation delay more predictable.

While the error detection and correction and propagation delay compensation capabilities provided by communications devices may be acceptable for some applications, there are applications where the communications devices' capabilities are unacceptable. An example of such an application is where power magnitude and phase information are communicated between substations. In these applications, even data errors within the error tolerance of the communications device may cause unacceptable control problems in a substation, such as excessive tap position changes of power transformers.

In addition, adaptive components in the communications devices may provide propagation delays that are unpredictable as a function of the communications device and the network or telecommunications channel. For certain applications, such as communication between substations, the propagation delays may be required to be predictable in order to enable substation control devices to determine the overall propagation delay between substations and to adjust control accordingly. In such data and time critical applications, a gateway or other device is desirable between the communications device and data receiving device to provide tighter tolerances on errors and consistent propagation delays incurred by the communications device as it processes the data received over a network.

SUMMARY OF THE INVENTION

The present invention is a method and system for correcting a data signal produced by a communications device by reducing the data errors produced by the communications device and by controlling the communications device so that it provides more predictable propagation delays.

According to one aspect of the invention, error signals are determined from signals generated by the communications device. As a function of the error signals, it is determined whether the communications device is operating within an allowable error bandwidth. If the communications device is not operating within the allowable error bandwidth, the data signal produced by the communications device is replaced with a guard signal.

According to a further aspect of the invention, the data signal produced by the communications device is replaced with a guard signal until the communications device has been operating within the allowable error bandwidth for a predetermined time interval.

According to another aspect of the invention, it is further determined whether the communications device has not been operating within an allowable error bandwidth for a first predetermined time interval. As a function of the signals generated by the communications device, it is also determined whether the communications device has been receiving an input signal having at least a predetermined minimal energy. If the communications device has not been operating within the allowable error bandwidth for the first predetermined time interval and the communications device has been receiving an input signal having at least the predetermined minimal energy, then after waiting a second predetermined time interval, an adaptive equalizer of the communications device is reset to perform a major convergence and the coefficients of the adaptive equalizer are set to predetermined initial values.

According to a further aspect of the invention, it is determined whether the communications device has not been operating within the allowable error bandwidth continuously for a third predetermined time interval after waiting a second predetermined time interval, resetting the adaptive component to perform a major convergence, and setting the coefficients of the adaptive component to predetermined initial values. If this determination is true, the adaptive component is reset to perform a major convergence, and the coefficients of the adaptive component are set to predetermined initial values.

According to another aspect of this invention, error signals are determined from signals generated by the communications device. As a function of the error signals, it is determined whether the communications device is operating within an allowable error bandwidth. It is further determined whether the communications device has not been operating within the allowable error bandwidth for a first predetermined time interval. As a function of the signals generated by the communications device, it is also determined whether the communications device has been receiving an input signal having at least a predetermined minimal energy. If the communications device has not been operating within the allowable error bandwidth for the first predetermined time interval and the communications device has been receiving an input signal having at least the predetermined minimal energy, then after waiting a second predetermined time interval, an adaptive equalizer of the communications device is reset to perform a major convergence and the coefficients of the adaptive equalizer are set to predetermined initial values

DETAILED DESCRIPTION OF PREFERRED EMBODIMENTS

Figure 1:
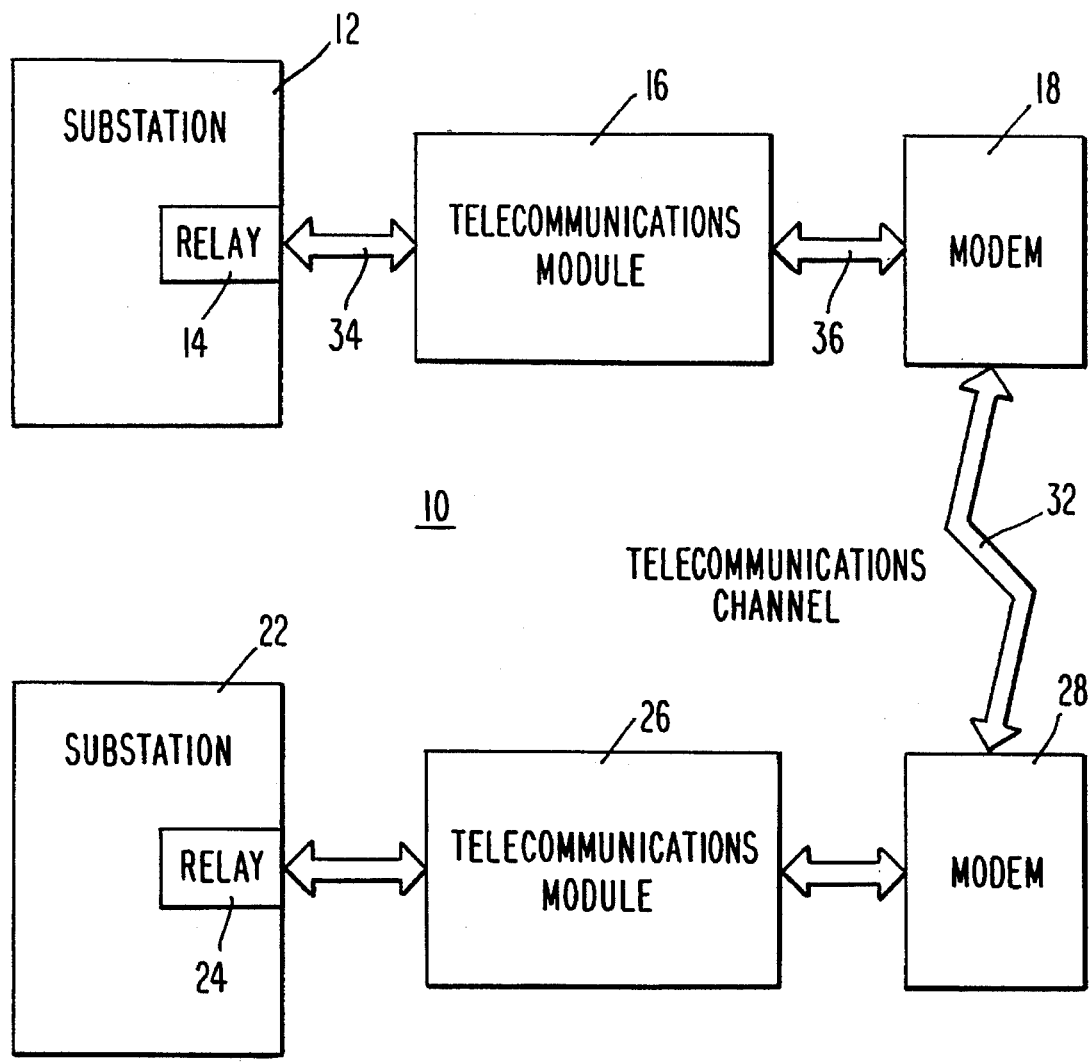
FIG. 1 is a block diagram of an exemplary configuration of a substation communications network.

An exemplary configuration of a substation communications network 10 embodying this invention is shown in FIG. 1. A brief overview of the invention is presented by reference to this exemplary communications network 10. In this network, substation 12 receives a data signal from substation 22, and substation 22 receives a data signal from substation 12. The data signal in the exemplary embodiment of the invention contains information related to the power magnitude and phrase of the transmitting substation.

When a substation sends a data signal to another substation in this system, the data signal is sent over a telecommunications channel or network 32 connected to the substations by interfaces. The interface for each substation 12 or 22 includes a data receiving device or relay 14 and 24, a gateway or telecommunications module 16 and 26, and a communications device or Modulator/Demodulator ("Modem") 18 and 28. In particular, if substation 12 desires to receive a data signal from substation 22 or any other substation (not shown) which has access to telecommunications channel 32, a communications device 18, in the exemplary embodiment a Modem, receives the data signal from the telecommunications channel 32. In the exemplary embodiment of the invention, the communications device 18 then processes the data signal and transmits the data signal to the gateway 16 via an interface 36.

The gateway 16 further processes the data signal and receives and provides control data to the communications device 18 via the interface 36. After the data signal has been processed by the gateway 16, the gateway sends a signal to the data receiving device 14, in the exemplary embodiment the relay in the substation 12, via the interface 34. The data receiving device 14 may process the data signal further and transmit it to another device such as a controller (not shown) or may directly perform operations as a function of the data signal.

As described in more detail below with reference to FIG. 2, the gateway 16 corrects the data signal received from the communications device 18 by reducing any errors of the data signal and making the propagation delay of the data signal more predictable. The gateway 16 reduces any errors in the data signal by replacing the data signal with a guard signal if the data signal received by the communications device 18 exceeds an allowable error bandwidth. The gateway 16 makes the propagation delay of the data signal received from the communications device 18 more predictable by controlling adaptive components of the communications device.

The gateway 16 first reduces the errors in the data signal by determining the error associated with the data signal being processed by the communications device. As part of the signal received from the communications device 18 by the gateway 16, there is error information which indicates the level of error associated with the data signal received from the telecommunications channel 32 and currently being processed by the communications device. The telecommunications channel 32 of this embodiment uses Quadrature Amplitude Modulation ("QAM") to transmit the data signal from communications device 18 to communications device 28, and vice versa.

Within each baud period, depending on the baud rate, the QAM data signal can be mapped onto an X-Y plane where X is equal to the amplitude of the signal times the cosine of the phase of the signal and Y is equal to the amplitude of the signal times the sine of the phase of the signal. Thus, during each baud period, data points of the data signal are ideally mapped to known locations in the X-Y plane. Due to noise, phase jitter, harmonic distortion, and other forms of signal corruption, the data points may not map to the ideal locations in the X-Y plane. The central processing unit 48 (shown in FIG. 2) of the communications devices 18 and 28 of the present invention have the ability to determine where the data point maps during each baud period and may have the ability to also determine the differential from the ideal location. The communications devices provide this information to the gateways, which use the error signals and the knowledge of the ideal locations (if the communications device does not send the differentials) to determine whether the error of the data point within this particular baud period is within the acceptable error bandwidth.

In one exemplary embodiment of the invention, the data signal produced by the communications device 18 is replaced with a guard signal which the gateway 16 transfers to relay 14 if the error associated with the data signal is greater than an allowable error bandwidth. Otherwise, the gateway transfers the data signal received from the communications device 18 to relay 14. When relay 14 receives the guard signal from the gateway 16 it knows the data signal is corrupted and does not process the guard signal which thus reduces errors associated with receiving and processing a corrupted data signal.

In another exemplary embodiment of the invention, the communications device 18 provides an error signal for one data signal while contemporaneously providing an earlier received signal to the gateway 16 due to processing delays in the communications device 18. In effect, in this embodiment, the error signal provided to the gateway 16 represents a data signal received by the communications device at a time $t_2$ while the data signal provided contemporaneously with the error signal to the gateway 16 was received by the communications device at a time $t_1$, where $t_2$ is later than $t_1$. In this embodiment, the gateway 16 replaces the data signal with the guard signal as soon as the error signal indicates that a data signal being processed by the communications device 18 has an error level that exceeds the allowable error bandwidth. The gateway then continues to replace the data signal with a guard signal for a fixed period of time after the error signal does not exceed the allowable error bandwidth. This embodiment has the advantage of avoiding sending corrupted data signals to relay 14 just as the signal starts to exceed the allowable error bandwidth. The fixed time period is preferably selected to insure that the data signal which corresponds to the error signal which exceeds the allowable error bandwidth has been received by the gateway 16, i.e., it is long enough to account for the processing delay of the communications device 18.

As noted above, the gateway 16 also corrects the data signal by making the propagation delay of the data signal received from the communications device 18 more predictable. The gateway 16 performs this function by controlling adaptive components of the communications device 18, in particular, the adaptive equalizer 58 and coefficient registers 68 shown in FIG. 2. The communications device of this embodiment performs adaptive processing to attempt to adapt to the propagation delays and perhaps phase or amplitude characteristics of the telecommunications channel 32. The adaptive processing comprises applying a Finite Impulse Response ("FIR") filter to the data signal using the adaptive equalizer. The adaptive equalizer, itself, introduces a propagation delay which varies as a function of the number of taps (coefficients) of the FIR filter. The coefficients used by the adaptive equalizer are stored in coefficient registers 68 in the communications device 18 and are determined by the adaptive equalizer using iterative convergence processes.

The function of the adaptive equalizer is to model the propagation, phase and amplitude characteristics of the telecommunications channel 32. Once the adaptive equalizer has determined a set of coefficients to model these characteristics, the adaptive equalizer only needs to perform a small number of iterations to model any minor fluctuations of the characteristics of the telecommunications channel. This process is known as performing a minor convergence, i.e., converging the inverse characteristics of the FIR filter to match the characteristics of the telecommunications channel. During the processing of a data signal, a change in the telecommunications channel may occur so that the communications device receives the data signal with characteristics that can not be modelled using a minor convergence process. For example, if a fault occurs in the data path the data signal had been traversing, an alternative path having different propagation delay, phase and amplitude characteristics may be assigned for the data signal. If this occurs the adaptive processing may need to perform a major convergence process to attempt to model the new characteristics of the telecommunications channel. A major convergence differs from a minor convergence in that the number of iterations necessary for the adaptive equalizer to model the characteristics of the telecommunications channel is much greater in a major convergence.

During a major convergence, the coefficients stored in the coefficient registers 68 are used as a starting point for the convergence or iterative process. Those coefficients modelled the previous characteristic of the data signal. By using those coefficients as the initial coefficients of the iterative process, the adaptive equalizer may not converge in a predictable manner and thus the FIR applied on the data signal may not actually model the propagation delay, phase and amplitude characteristics of the telecommunications channel 32.

The inventor has found that the iterative process produces a more predictable propagation delay, i.e., a more consistent modelling of the characteristics of the telecommunications channel, by using the same initial set of coefficients for each major convergence process that is performed. As a consequence, in this invention, gateway 16 replaces the coefficients in the coefficient register 68 with an initial set of coefficients and forces the adaptive equalizer to perform a major convergence. The gateway 16 forces the adaptive equalizer to perform a major convergence before the communications device 18 may to avoid the adaptive equalizer from performing a major convergence using the previous set of coefficients as the starting point of the iterative process. Thus, by using the same initial set of coefficients, thereby causing the adaptive equalizer to be more likely to converge on a FIR filter which models the characteristics of the telecommunications channel, the propagation delay can be determined in a more predictable manner, i.e, this makes the propagation delay more predictable since the modelling of the propagation delay of the data signal is more consistent after each major convergence.

The present invention may be embodied in the gateway or telecommunications module 16. FIG. 2 is a block diagram of an exemplary embodiment of a gateway or telecommunications module 16 of the present invention. As shown in FIG. 2, the telecommunications module 16 communicates with the data receiving device or relay 14 via interface 34 where the interface is further comprised of a control interface 44 and a data interface 54. The gateway or telecommunications module 16 communicates with the communications device or Modem 18 via a control 42, data 52, and address 62 interface. The gateway 16 is comprised of a Digital Signal Processing ("DSP") CPU, an Erasable Programmable Read Only Memory ("EPROM"), and a Random Access Memory ("RAM"). The EPROM may contain the program code used by the DSP CPU to interact with relay 14 and the communications device 18. The RAM may be used to store data while the DSP CPU is processing other data.

As noted above, the gateway 16 is used to correct data by reducing errors and making the propagation delay of data signals more predictable. Embodiments of these two functions are explained by reference to FIGS. 3 and 4. In particular, the function of reducing errors of a data signal is explained with reference to FIG. 3 and the function of making the propagation delay of data signals more predictable is explained with reference to FIG. 4. Each of these Figures are diagrams showing the steps performed by exemplary embodiments of the present invention.

Figure 3:
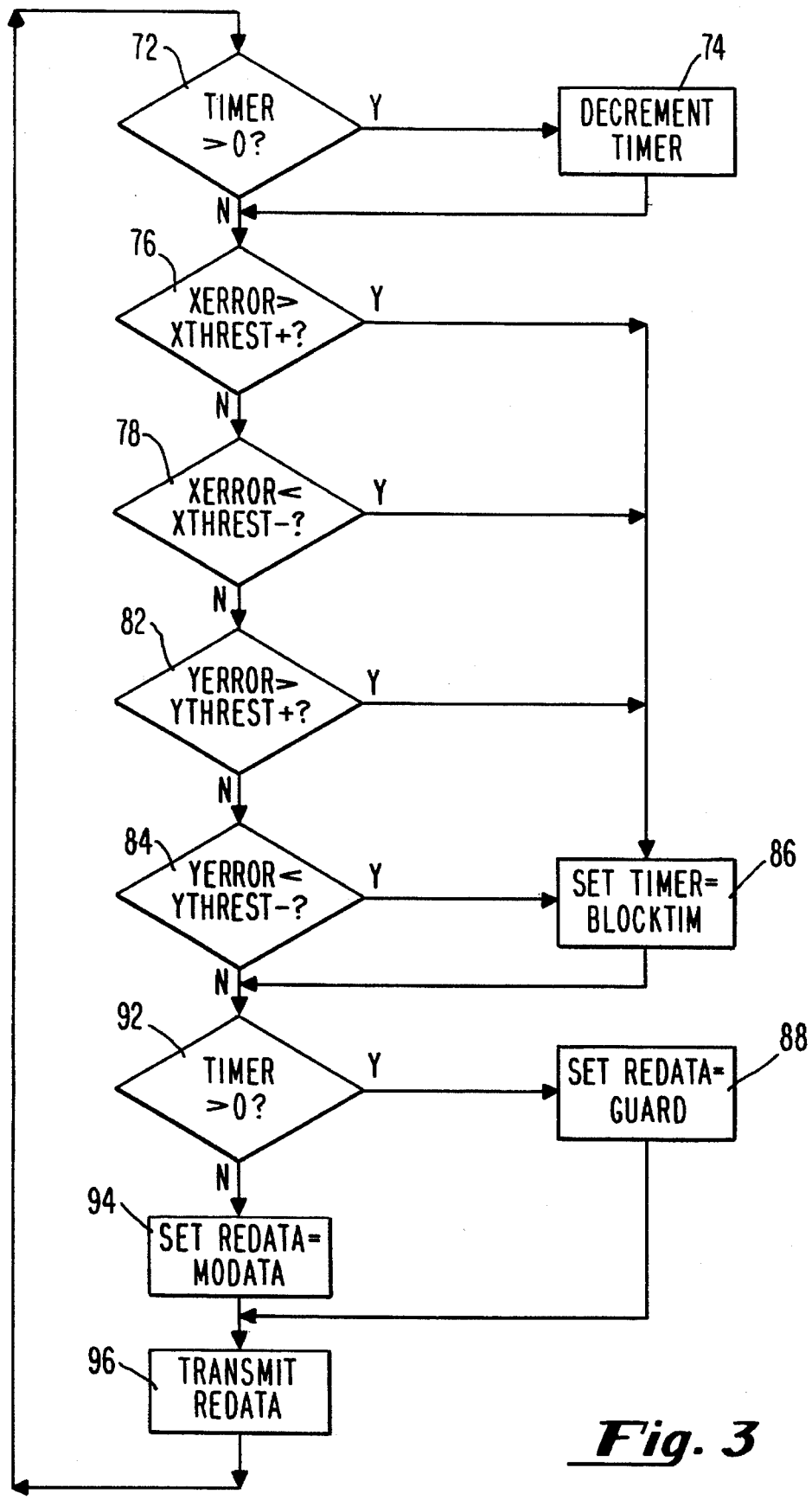
FIG. 3 is a block diagram of an exemplary process of the invention.

The steps shown in FIG. 3 are used in the exemplary embodiment explained above where the error signal provided to the gateway 16 represents a data signal received by the communications device at a time $t_2$ while the data signal provided contemporaneously with the error signal to the gateway 16 was received by the communications device at a time $t_1$, where $t_2$ is later than $t_1$. As described above, in this embodiment, once the error signal exceeds the allowable error bandwidth, the data signal is replaced by a guard signal until the error signal has not exceeded the allowable error bandwidth for a fixed period.

The diagram in FIG. 3 shows an exemplary embodiment of the invention for performing this function. The first step, step 72, determines whether a TIMER is greater than zero. If so, the TIMER is decremented in step 74 by the amount of time that has passed since this test was last performed. As will become clear when the remaining steps are described, the TIMER is used to insure that the guard signal replaces the data signal until the error signal has been acceptable for a fixed period of time. The next four steps, steps 76, 78, 82, and 84, are used to determine whether the error signal exceeds the allowable error bandwidth for this embodiment. As noted earlier, a data point of the data signal can be projected onto an X-Y plane during each baud period. The communications device 18 of this embodiment models the error of a data point as an error vector in the X-Y plane where the vector extends from the ideal location of the data point to the actual location of the data point. The values XTHREST+ and XTHREST− represent the largest permissible values of the error vector with respect to the X direction. If the error vector (which represents the deviation or differential) exceeds either of these thresholds, the TIMER is set to BLOCKTIM in step 86, where BLOCKTIM is a period of time preferably greater than or equal to the data signal propagation delay of the communications device 18.

The values YTHREST+ and YTHREST− represent the largest permissible values of error vector with respect to the Y direction. If the error vector (deviation or differential) exceeds either of these thresholds, the TIMER is set to BLOCKTIM in step 86. The thresholds XTHREST+, XTHREST−, YTHREST+ and YTHREST− represent the allowable error bandwidth for the error signal in this exemplary embodiment of the invention.

Then, in steps 92, 88, and 96, if the TIMER is greater than zero, REDATA is set to GUARD and transmitted to relay 14, where GUARD represents the guard signal. If the TIMER is greater than zero, then the error signal has not been within allowable error bandwidth for a fixed period of time thus requiring the data signal to be replaced with a guard signal. Otherwise, in steps 92, 94, and 96 (when the TIMER is not greater than zero, indicating the data signal is acceptable) the data signal (denoted as MODATA) is transmitted to relay 14.

In another embodiment of the invention, a data signal and its corresponding error signal are received contemporaneously by the gateway 16. In this embodiment no TIMER is required and thus steps 72, 74, 86, and 92 would not be used in this embodiment and step 88 would be moved to the position of step 86 and would bypass step 94. Thus, in this embodiment, steps 76, 78, 82, and 84 would determine whether the error signal is within the allowable error bandwidth. If not, steps 88 and 96 would be performed and a guard signal would be sent to relay 14. Otherwise, steps 94 and 96 would be performed and the data signal (MODATA) would be sent to relay 14. Thus, FIG. 3 represents an exemplary embodiment of the invention for reducing the error in the data signal.

Figure 2:
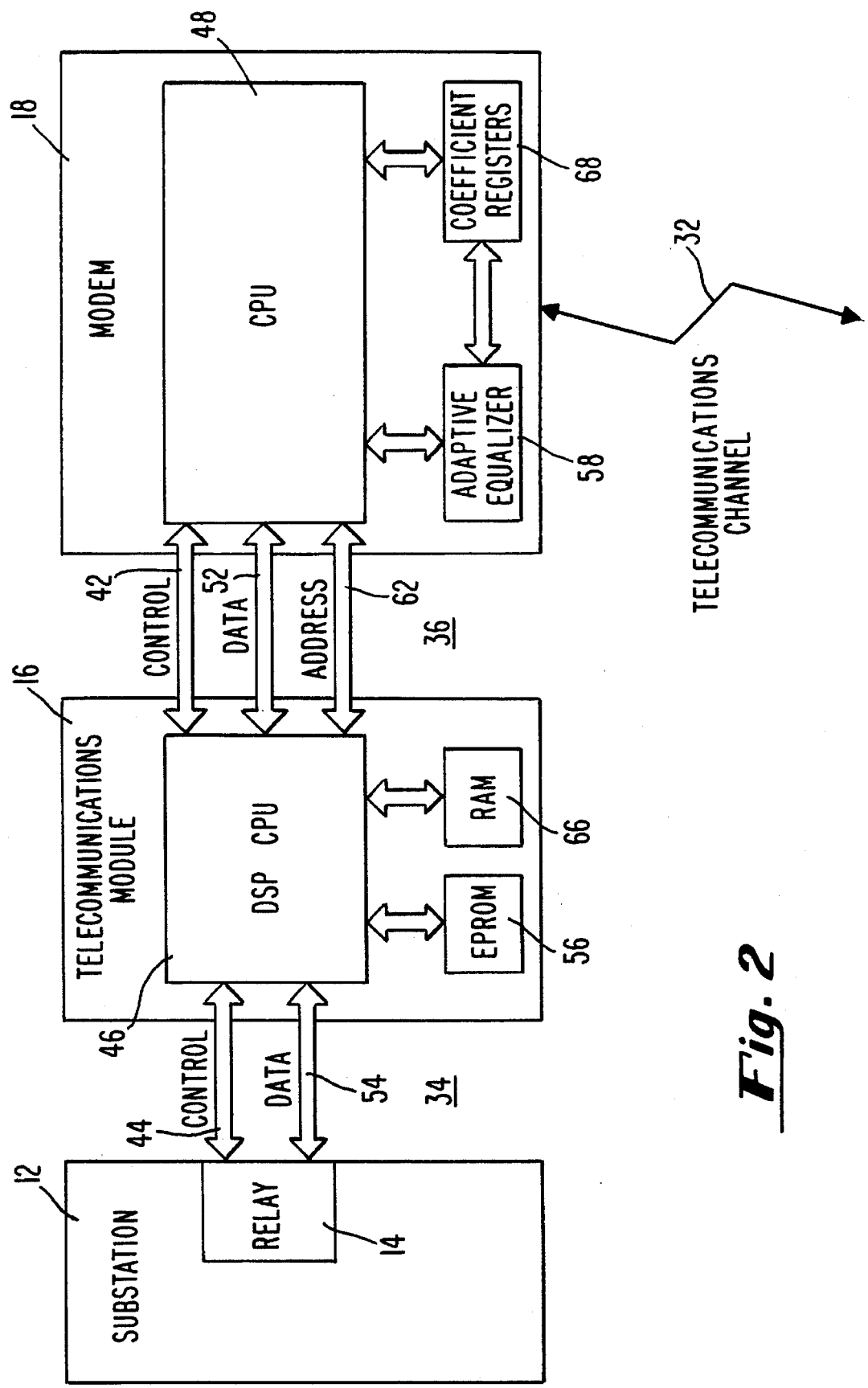
FIG. 2 is a block diagram of a portion of the network shown in FIG. 1 which depicts an exemplary configuration of the invention.
Figure 4:
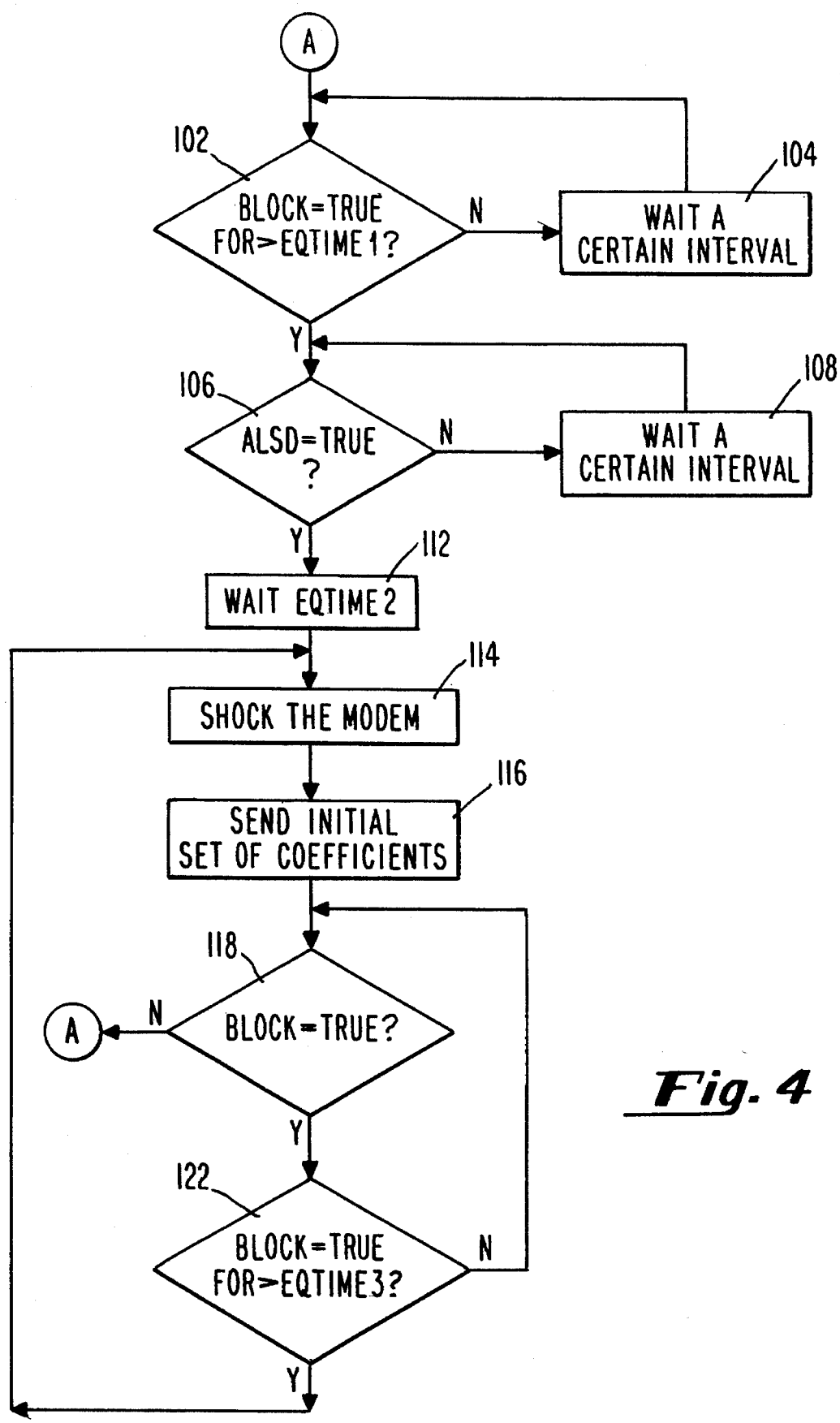
FIG. 4 is another block diagram of an exemplary process of the invention.

FIG. 4 represents an exemplary embodiment of the invention for making the propagation delay of the data signal more predictable for the exemplary configuration shown in FIG. 2. As described above, the data signal is made more predictable by replacing the coefficients in the coefficient register 68 with initial values and forcing the adaptive equalizer 58 (shown in FIG. 2) to do a major convergence. The steps for achieving this result are detailed in FIG. 4. The first step, step 102, requires determining whether the error signal has been exceeding the allowable error bandwidth for a fixed period of time. As shown in step 102, it is tested whether BLOCK has been TRUE for a period of time greater than EQTIME1. BLOCK is set to TRUE while the data signal is being replaced with a guard signal. EQTIME1 is ideally shorter than the time period the communications device 18 waits while receiving a corrupted signal before performing a major convergence (where a signal is considered to be corrupted if a minor convergence can not model the characteristics of the telecommunications channel). If the data signal has been replaced by the guard signal for a time greater than EQTIME1, then step 106 is performed, otherwise, step 102 is performed again after waiting a certain time interval (step 104).

If the data signal has been blocked by the guard signal (BLOCK=TRUE) for the required time interval (EQTIME1), then the adaptive equalizer 58 will be forced to perform a major convergence by the gateway 16, but only if the communications device has been receiving a data signal with a minimal signal energy as tested in step 106. In step 106, it is tested whether RLSD is TRUE where RLSD is true when the signal strength of the data signal received by the communications device exceeds a minimal threshold (also know as carrier detect). The minimal threshold is at least that which would enable the adaptive equalizer to perform a major convergence, i.e., the data signal must have sufficient energy in order for the adaptive equalizer to be able to adapt to it and the characteristics of the telecommunications channel.

If the received signal energy is sufficient (RLSD=TRUE or carrier detect) then steps 112, 114, 116 are performed to wait an interval (EQTIME2) and then force the adaptive equalizer to perform a major convergence using an initial set of coefficients. In step 112, an interval of time, EQTIME2, is waited to allow the received signal to stabilize. Then in step 114, the adaptive equalizer is forced to perform a major convergence. It was found that if a particular communications device (a ROCKWELL R96DP 9600 bps Data Pump Modem) was shocked by changing its current baud rate, waiting a short interval, and then changing the baud rate back again, it automatically performed a major convergence after resetting using the coefficients in the coefficient register 68 as the starting set of coefficients. This Modem is used in the exemplary configuration.

Once the adaptive equalizer is forced to do a major convergence (or once the Modem is shocked in the exemplary embodiment of the invention), in step 116, the coefficients in the coefficient register are set to an initial set of coefficients. As explained above, this makes the adaptive equalizer 58 start with the same set of coefficients whenever it performs a major convergence, which makes it more likely that final set of coefficients will model the propagation delay, i.e., that the iterative process will converge. Thus, this exemplary embodiment of the invention makes the propagation delay of the data signal more predictable. The initial set of coefficients may be determined experimentally.

In another exemplary embodiment of this function, steps 118 and 122 are also performed to force the adaptive equalizer to do a major convergence again using the initial set of coefficients if the block is still on after a fixed time interval EQTIME3. This exemplary embodiment forces a major convergence if the data signal remains corrupted for a fixed time period after a major convergence was already performed. This embodiment will continue to force major convergences until the data signal is not blocked.

Although the invention has been described in terms of an exemplary embodiment, the spirit and scope of the appended claims are unlimited by any details not expressly stated in the claims. For example, a fiber optics telecommunications channel and the corresponding communications devices could be used in place of the QAM modems and telecommunications channel in the exemplary embodiment.

What is claimed is:

1. A method of generating a power signal for a power system from signals generated by a communications device, said method comprising the steps of:

a) determining error signals from the signals generated by the communications device;

b) determining, as a function of said error signals, whether said communications device is operating within an allowable error bandwidth of the power system; and c) when the communications device is operating within the allowable error bandwidth, generating the power signal from the signals generated by the communications device and when the communications device is not operating within the allowable error bandwidth, generating the power signal from a guard signal where the power system ignores the power signal when it is generated from a guard signal.

2. A method according to claim 1, wherein step c) comprises:

replacing the data signal with the guard signal until said communications device has been operating within the allowable error bandwidth for a predetermined time interval.

3. A method according to claim 1, wherein the communications device is a modem.

4. A method according to claim 1, wherein the communications device has an adaptive component and said adaptive component has coefficients which may be set, further comprising the steps of:

d) determining whether said communications device has not been operating within the allowable error bandwidth for a first predetermined time interval;

e) determining, as a function of the signals generated by said communications device, whether said communications device has been receiving an input signal having at least a predetermined minimal energy from a communications channel; and f) performing substeps f(i) to f(iii) if said communications device has not been operating within the allowable error bandwidth for the first predetermined time interval and said communications device has been receiving an input signal having at least the predetermined minimal energy;
   (i) waiting a second predetermined time interval;
   (ii) resetting the communications device to perform a major convergence of the adaptive component to model characteristics of the communications channel; and
   (iii) setting the coefficients of the adaptive component to predetermined initial values.

5. A method according to claim 4, further comprising the step of:

performing substeps f(ii) to f(iii) if the communications device has not been operating within the allowable error bandwidth continuously for a third predetermined time interval after an earlier performance of substeps f(i) to f(iii).

6. A method according to claim 5, wherein step c) comprises:

replacing the data signal with the guard signal until said communications device has been operating within the allowable error bandwidth for a fourth predetermined time interval.

7. A method of generating a power signal for a power system from signals generated by a communications device, wherein said communications device has an adaptive component and said adaptive component has coefficients which may be set, said method comprising the steps of:

a) determining error signals from the signals generated by the communications device;

b) determining, as a function of said error signals, whether said communications device is operating within an allowable error bandwidth of the power system;

c) determining whether said communications device has not been operating within the allowable error bandwidth for a first predetermined time interval;

d) determining, as a function of the signals generated by said communications device, whether said communications device has been receiving an input signal having at least a predetermined minimal energy from a communications channel; and e) performing substeps e(i) to e(iii) if said communications device has not been operating within the allowable error bandwidth for the first predetermined time interval and said communications device has been receiving an input signal having at least the predetermined minimal energy;
   (i) waiting a second predetermined time interval;
   (ii) resetting the communications device to perform a major convergence of the adaptive component to model characteristics of the communications channel; and
   (iii) setting the coefficients of the adaptive component to predetermined initial values.

8. A method according to claim 7, further comprising the step of:

performing substeps e(ii) to e(iii) if the communications device has not been operating within the allowable error bandwidth continuously for a third predetermined time interval after an earlier performance of substeps e(i) to e(iii).

9. A system for generating a power signal for a power system from signals generated by a communications device, said system comprising:

means for determining error signals from the signals generated by the communications device;

means for determining, as a function of said error signals, whether said communications device is operating within an allowable error bandwidth of the power signal; and generation means for generating the power signal from the signals generated by the communications device when the communications device is operating within the allowable error bandwidth, and when the communications device is not operating within the allowable error bandwidth, generating the power signal from a guard signal where the power system ignores the power signal when it is generated from a guard signal.

10. A system according to claim 9, wherein said replacement means comprises:

means for replacing the data signal with the guard signal until said communications device has been operating within the allowable error bandwidth for a predetermined time interval.

11. A system according to claim 9, wherein the communications device is a modem.

12. A system according to claim 9, wherein the communications device has an adaptive component, said adaptive component has coefficients which may be set, and said system further comprises:

means for determining whether said communications device has not been operating within the allowable error bandwidth for a first predetermined time interval;

means for determining, as a function of the signals generated by said communications device, whether said communications device has been receiving an input signal having at least a predetermined minimal energy from a communications channel; and means for waiting a second predetermined time interval, resetting the communications device to perform a major convergence of the adaptive component to model characteristics of the communications channel, and setting the coefficients of the adaptive component to predetermined initial values if said communications device has not been operating within the allowable error bandwidth for the first predetermined time interval and said communications device has been receiving an input signal having at least the predetermined minimal energy.

13. A system according to claim 12, wherein said system further comprises:

means for resetting the communications device to perform a major convergence of the adaptive component to model characteristics of the communications channel and setting the coefficients of the adaptive component to predetermined initial values if the communications device has not been operating within the allowable error bandwidth continuously for a third predetermined time interval after waiting a second predetermined time interval, resetting the communications device to perform a major convergence of the adaptive component to model characteristics of the communications channel, and setting the coefficients of the adaptive component to predetermined initial values.

14. A system according to claim 13, wherein said replacement means comprises:

means for replacing the data signal with the guard signal until said communications device has been operating within the allowable error bandwidth for a fourth predetermined time interval.

15. A system for generating a power signal for a power system from signals generated by a communications device wherein said communications device has an adaptive component and said adaptive component has coefficients which may be set, said system comprising:

means for determining error signals from the signals generated by the communications device;

means for determining, as a function of said error signals, whether said communications device is operating within an allowable error bandwidth of the power system;

means for determining whether said communications device has not been operating within the allowable error bandwidth for a first predetermined time interval;

means for determining, as a function of the signals generated by said communications device, whether said communications device has been receiving an input signal having at least a predetermined minimal energy from a communications channel; and means for waiting a second predetermined time interval, resetting the communications device to perform a major convergence of the adaptive component to model characteristics of the communications channel, and setting the coefficients of the adaptive component to predetermined initial values if said communications device has not been operating within the allowable error bandwidth for the first predetermined time interval and said communications device has been receiving an input signal having at least the predetermined minimal energy.

16. A system according to claim 15, wherein said system further comprises:

means for resetting the communications device to perform a major convergence of the adaptive component to model characteristics of the communications channel and setting the coefficients of the adaptive component to predetermined initial values if the communications device has not been operating within the allowable error bandwidth continuously for a third predetermined time interval after waiting a second predetermined time interval, resetting the communications device to perform a major convergence of the adaptive component to model characteristics of the communications channel, and setting the coefficients of the adaptive component to predetermined initial values.

17. A method of generating and providing a power signal for a power system, said method comprising the steps of:

a) receiving signals generated by a quadrature amplitude modulation ("QAM") modem, the signals including data signals;

b) determining error signals from the signals generated by the QAM modem;

c) determining, as a function of said error signals, whether the QAM modem is operating within an allowable error bandwidth for the power system;

d) generating the power signal from the data signals generated by the QAM modem when the QAM modem is operating within the allowable error bandwidth and generating the power signal from a guard signal when the QAM modem is not operating within the allowable error bandwidth where the power system ignores the power signal when it is generated from a guard signal; and e) transmitting the power signal to the power system.

18. A method according to claim 17, wherein the power system is a substation and the data signals comprise power magnitude and power phase information.

19. A method according to claim 18, wherein step d) comprises:

generating the power signal from a guard signal until the QAM modem has been operating within the allowable error bandwidth for a predetermined time interval.

20. A method according to claim 17, wherein the QAM modem has an adaptive component and said adaptive component has coefficients which may be set, further comprising the steps of:

f) determining whether the QAM modem has not been operating within the allowable error bandwidth for a first predetermined time interval;

g) determining, as a function of the signals generated by the QAM modem, whether the QAM modem has been receiving an input signal having at least a predetermined minimal energy from a communications channel;

h) performing substeps h(i) to h(iii) if the QAM modem has not been operating within the allowable error bandwidth for the first predetermined time interval and the QAM modem has been receiving an input signal having at least the predetermined minimal energy;

(i) waiting a second predetermined time interval;

(ii) resetting the QAM modem to perform a major convergence of the adaptive component to model characteristics of the communications channel; and (iii) setting the coefficients of the adaptive component to predetermined initial values; and i) performing substeps h(ii) to h(iii) if the QAM modem has not been operating within the allowable error bandwidth continuously for a third predetermined time interval after an earlier performance of substeps h(i) to h(iii).

21. A method according to claim 20, wherein step d) comprises:

generating the power signal from a guard signal until the QAM modem has been operating within the allowable error bandwidth for a fourth predetermined time interval.

22. A system for generating and providing a power signal for a power system, said system comprising:

means for receiving signals generated by a quadrature amplitude modulation ("QAM") modem, the signals including data signals;

means for determining error signals from the signals generated by the QAM modem;

means for determining, as a function of said error signals, whether the QAM modem is operating within an allowable error bandwidth for the power system;

generation means for generating the power signal from the data signals generated by the QAM modem when the QAM modem is operating within the allowable error bandwidth and generating the power signal from a guard signal when the QAM modem is not operating within the allowable error bandwidth where the power system ignores the power signal when it is generated from a guard signal; and means for transmitting the power signal to the power system.

23. A system according to claim 22, wherein the power system is a substation and the data signals comprise power magnitude and power phase information.

24. A system according to claim 23, wherein the generation means comprises:

means for generating the power signal from a guard signal until the QAM modem has been operating within the allowable error bandwidth for a predetermined time interval.

25. A system according to claim 24, wherein the QAM modem has an adaptive component and said adaptive component has coefficients which may be set, the system further comprising:

means for determining whether the QAM modem has not been operating within the allowable error bandwidth for a first predetermined time interval;

means for determining, as a function of the signals generated by the QAM modem, whether the QAM modem has been receiving an input signal having at least a predetermined minimal energy from a communications channel; and means for waiting a second predetermined time interval, resetting the QAM modem to perform a major convergence of the adaptive component to model characteristics of the communications channel, and setting the coefficients of the adaptive component to predetermined initial values if the QAM modem has not been operating within the allowable error bandwidth for the first predetermined time interval and the QAM modem has been receiving an input signal having at least the predetermined minimal energy.

26. A system according to claim 25, further comprising:

means for resetting the QAM modem to perform a major convergence of the adaptive component to model characteristics of the communications channel, and setting the coefficients of the adaptive component to predetermined initial values if the QAM modem has not been operating within the allowable error bandwidth continuously for a third predetermined time interval after waiting a second predetermined time interval, resetting the QAM modem to perform a major convergence of the adaptive component to model characteristics of the communications channel, and setting the coefficients of the adaptive component to predetermined initial values.

* * * * *